United States Patent [19]

Haarmann et al.

[11] Patent Number: 4,906,820

[45] Date of Patent: Mar. 6, 1990

[54] TEMPERATURE CONTROL METHOD AND CIRCUIT FOR CONTROLLING THE TEMPERATURE IN A HEATABLE COMPARTMENT OF AN APPLIANCE

[75] Inventors: Peter Haarmann, Kammerstein; Heinz Kusebauch, Rednitzhembach, both of Fed. Rep. of Germany

[73] Assignee: Memmert GmbH & Co. KG, Schwabach, Fed. Rep. of Germany

[21] Appl. No.: 201,991

[22] Filed: Jun. 3, 1988

[30] Foreign Application Priority Data

Jun. 5, 1987 [DE] Fed. Rep. of Germany ....... 3718809

[51] Int. Cl.⁴ .............................................. H05B 1/02
[52] U.S. Cl. ..................................... 219/497; 219/501; 219/505; 219/494; 219/491; 323/237; 323/244
[58] Field of Search ............... 219/491, 494, 497, 494, 219/501, 505, 507, 509; 307/117; 323/237, 244

[56] References Cited

U.S. PATENT DOCUMENTS

| | | | |
|---|---|---|---|
| 3,946,200 | 3/1976 | Juodikis | 219/497 |
| 3,961,236 | 6/1976 | Rodek et al. | 219/497 |
| 4,093,847 | 6/1978 | Walker et al. | 219/497 |

FOREIGN PATENT DOCUMENTS 1387830 12/1964 France .
2215589 8/1974 France .
2124411 2/1984 United Kingdom .

Primary Examiner—M. H. Paschall
Attorney, Agent, or Firm—Spencer & Frank

[57] ABSTRACT

The invention relates to a temperature control method and to a temperature control circuit. In a measured value detecting member (2) a measuring voltage ($U_{TH}$) is generated which is representative of the actual temperature. In an adjustment member (1), a desired voltage ($U_S$) is generated which is representative of the desired temperature. A difference former (inverse adder 5) determines from the measuring voltage ($U_{TH}$) and the desired voltage ($U_S$) a deviation voltage ($U_D$) which corresponds to the deviation between the desired temperature and the actual temperature. The heating power of the heating element (14) of the temperature control circuit is regulated proportionately in dependence on the deviation voltage ($U_D$) by shifting the phase angle ($\phi$). During each line half-wave (27), the deviation voltage ($U_D$) is compared in a comparator (comparator 11) with the descending edge voltage of a line-synchronous delta voltage ($U_{DS}$). Beginning with the point in time at which these two voltages ($U_D$ and $U_{DS}$) are identical, the comparator (comparator 11) generates an output signal which controls the position of the phase angle ($\phi$).

7 Claims, 4 Drawing Sheets

TEMPERATURE CONTROL METHOD AND CIRCUIT FOR CONTROLLING THE TEMPERATURE IN A HEATABLE COMPARTMENT OF AN APPLIANCE

BACKGROUND OF THE INVENTION

The invention relates to a temperature control method particularly in appliances having a heatable compartment such as heating cabinets, incubators, sterilizers or thermal baths.

The compartment is heated by a heating element supplied with heating power by line voltage regulated by a controllable switch which can be turned on at a controllable phase angle of the line voltage. A deviation voltage is obtained by forming the difference between a measuring voltage representing an actual temperature in the compartment and a desire voltage representing a desired temperature in the compartment. The phase angle of the controllable switch is shifted in proportion to the deviation voltage. A line-synchronous delta voltage having a waveform presenting a descending edge region is generated from the line voltage. The deviation voltage is compared with the descending edge region of the line-synchronous delta voltage during each half wave of the line voltage and an output signal is generated which controls the position of the phase angle for turning on the controllable switch from the time when the amplitudes of the desired voltage and the actual voltage have the same amplitude.

A known temperature control method in a limited space (control path) which is often employed because of its simple circuitry realization possibilities is the so-called two-point method in which the correcting variable is fed to the control circuit in the form of an 0–1 function. In this method, heating continues at full power in a temperature control circuit until the desired temperature is reached. Then the heating element is disconnected. The remaining residual heat of the heating system, however, heats the control path to above the desired temperature, i.e. the correcting variable overshoots. When the temperature falls below the desired temperature, the full heating power is turned on again until the desired temperature is again attained. Thus, the actual, two-point regulated temperature fluctuates over a relatively broad range around the desired temperature.

If, for application specific reasons, the desired temperature is to be regulated more precisely, more expensive regulators must be employed, for example proportional or proportional/integral differential regulators.

In an electronic proportional regulator (P regulator) for temperature regulation, a measured value detection component generates a measuring voltage which is representative of the actual temperature and an adjustment member generates a desired voltage which is representative of the desired temperature. From the measuring voltage and the desired voltage, a difference former forms a deviation voltage which corresponds to the deviation between the desired temperature and the actual temperature. The latter serves as a measure for the heating power to be fed into the system to be regulated. Thus, the heating power is proportional to the deviation. In particular, if a system temperature is regulated which lies at a temperature level above room temperature, an essentially constant component, which is a function of the absolute amount of the desired temperature, must be included in the percentage of the heating power which is proportional to the deviation. Essentially, this is the so-called integral component in a proportional/integral regulator.

In heating systems supplied with line voltage, the heating power is generally regulated in proportion with the deviation by way of phase angle control. This means that the phase angle is set to correspond to the deviation.

SUMMARY OF THE INVENTION

It is the object of the invention to provide a temperature control method in which setting the phase angle in correspondence with the deviation is realized in a particularly simple manner.

The above and other objects are accomplished according to the invention wherein there is provided a method in the context of the method first described above which additionally includes the step of generating a line-synchronous delta voltage having a waveform presenting a first descending edge region which has a relatively large voltage drop per unit of time down to a limit voltage when the deviation voltage is below a settable voltage threshold, and a second descending edge region following in time the first descending edge region which has a relatively small voltage drop per unit of time. Accordingly, during each line half-wave, the deviation voltage is compared in a comparator with the descending edge voltage of a line-synchronous delta voltage. Beginning with the time at which these two voltages are identical, the comparator generates an output signal which controls the phase angle position. This control is effected by a known actuating circuit for the triac of the phase angle control. In spite of the simplicity of the circuit, the regulating behavior that can be realized is substantially improved compared to two-point regulators. Another advantage of the method according to the invention is that the proportional regulating component can be varied by the ratio of the maximum amplitude of the delta voltage to the amount of the deviation voltage and by the steepness of the descending edge of the delta voltage.

According to a modification of the method according to the invention it is possible to vary the proportional regulating component together with the changing deviation. In this way, the regulating behavior of the regulator can be optimized in a technologically simple manner, i.e. it can be set so that, on the one hand, overshooting of the control variable can be reduced considerably and, on the other hand, the desired value can be reached quickly.

In a further modification of the invention the descending edge region of the delta voltage can be varied below a set threshold value of the deviation voltage—i.e. if a certain deviation between actual and desired temperature is reached—so that it has a time curve in which there is a great drop in voltage per unit time until a limit voltage is reached and then there is a small drop in voltage per unit time. In this way, the angle position of the phase angle can be pushed forward in the direction of 0° if the actual temperature approaches the desired temperature, which means that the control path receives a percentage of the heating power which is increased compared to the normal proportional regulating percentage. In practice, an integral component is thus added to the proportional regulating component to ensure that the proportional deviation which always exists in a proportional regulator is brought almost to zero and the desired temperature level is maintained. In the method according to the invention this is accomplished in a simple manner by varying the delta voltage in its descending edge region.

By being able to adjust the value of the above-mentioned limit voltage, the integral component can be varied and thus the regulator can be optimized in a technologically simple manner.

According to another aspect of the invention there is provided a temperature control circuit and advantageous modifications thereof which employ the control method according to the invention.

According to this aspect of the invention, the outputs of the difference former for generating the deviation voltage and of the delta voltage generator are electrically connected with the inputs of a comparator which generates an output signal to control the phase angle of the heating element if there is coincidence between the delta voltage and the deviation voltage. Therefore, the control circuit has a very simple configuration.

According to the circuit of the invention, the delta voltage is in synchronism with the line voltage and has a descending edge which can be varied. This generator is essentially composed of a capacitor which is charged with a short time constant during the zero passage of the line half-wave and is discharged with a medium time constant by way of a discharging circuit during the remaining line half-period and with a short time constant from the time the deviation voltage has reached the threshold value until it reaches the limit voltage and then with a long time constant. The discharging circuit is composed of a logic circuit and a resistance network connectable thereto. The logic circuit is here constructed of two comparators and an AND-gate.

The structure of the resistance network defined in claim realization of the variable descending edge behavior of the delta voltage generator is preferably accomplish by means of only two electronic switches.

In summary, by means of the temperature control method according to the invention, the control circuit can be designed so as to be set easily and quickly, thus, on the one hand, considerably reducing overshooting and, on the other hand, quickly attaining the desired value. The regulation is constant and variation of the delta voltage in its descending edge region enables the regulation to supply so much energy to the system to be regulated as is required for quickly reaching and maintaining a desired temperature value.

The method according to the invention and the control circuit according to the invention will now be described in greater detail for one embodiment thereof with reference to the attached figures. It is shown in:

DETAILED DESCRIPTION OF THE PREFERRED EMBODIMENTS

Figure 1:
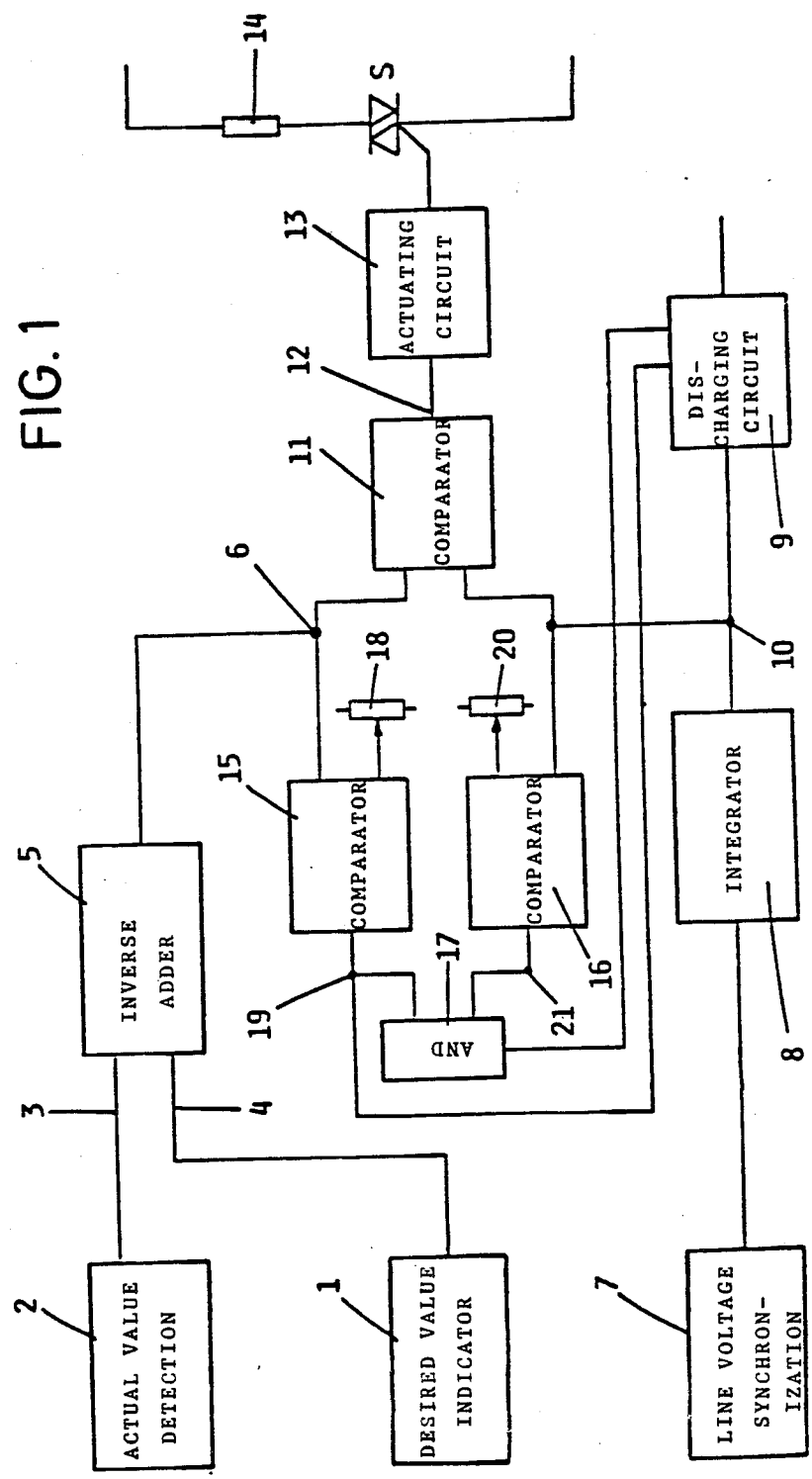
FIG. 1, a block circuit diagram of the temperature control circuit.

FIG. 1 shows the temperature control circuit as a block circuit diagram. The control circuit serves the purpose of regulating the temperature, for example, of a heating cabinet (not shown) to a predetermined desired temperature. For this purpose, a desired voltage $U_S$ representative of the desired temperature is generated in an adjustment member 1. Thus, the adjustment member is essentially composed of a voltage source which puts out an adjustable constant voltage.

In a measured value detecting member 2, a measuring voltage $U_{TH}$ is generated which is representative of the actual temperature. As is known, for example, a temperature sensitive platinum resistor is employed for this purpose as the temperature sensor in the heating cabinet. A constant current flows through the platinum resistor. The voltage dropped across the resistor is representative of the temperature in the heating cabinet. Conventional voltage amplifiers and feeder line compensators are installed in measured value detecting member 2. A measuring voltage $U_{TH}$ which is proportional to the temperature in the heating cabinet can ultimately be obtained at the output of measured value detecting member 2.

To determine the deviation between the desired temperature and the actual temperature, measuring voltage $U_{TH}$ and desired voltage $U_S$ are fed to the inputs 3 and 4 of an inverse adder 5 which acts as difference former.

Since the desired voltage $U_S$ is designed to be positive and the measuring voltage $U_{TH}$ is designed to be negative, the difference between these two voltages is formed by way of addition. A deviation voltage $U_D$ corresponding to the deviation between desired and actual temperature can be obtained at the output or, more precisely, at branch point 6 of inverse adder 5, with the sign of this deviation voltage being changed by the inverse addition.

Another significant part of the temperature control circuit according to the invention is the delta voltage generator which is composed of a line voltage synchronizing member 7, an integrator 8 and a discharging circuit 9. Rectified line half-waves 27 (FIGS. 3, 4) are fed into line voltage synchronizing member 7. Upon the zero passage of this line half-wave, integrator 8 is charged with a short time constant and is then discharged via discharging circuit 9. At output 10 of integrator 8, a negative, line synchronous delta voltage $U_{DS}$ is generated.

The deviation voltage $U_D$, which is negative in amount if the actual temperature lies below the desired temperature, and the delta voltage $U_{DS}$ are fed to a comparator 11. The latter produces no output signal at its output 12 for actuating circuit 13 as long as the amount of delta voltage $U_{DS}$ in its descending edge region is greater than the deviation voltage $U_D$. As will be described in connection with FIGS. 3 and 4, this causes a triac S of the phase angle control for the line-supplied heating element 14 of the heating cabinet to be fired via actuating circuit 13 with a phase angle $\phi$ which corresponds to a deviation between desired temperature and actual temperature. In this way, a power regulation proportional to the deviation is realized for heating element 14.

Discharging circuit 9 and thus the time behavior of delta voltage $U_{DS}$ in the descending edge region can be influenced by a logic circuit composed of comparators 15 and 16 and an AND-gate 17. Starting at branch point 6, the deviation voltage $U_D$ is fed to the one input of comparator 15. At the second input of this comparator 15, there appears a negative threshold voltage $U_{SCH}$ which can be set by a voltage divider 18. As long as deviation voltage $U_D$ is more negative than threshold voltage $U_{SCH}$, a signal is given to discharging circuit 9 from output 19 of comparator 15 which causes integrator 8 to be discharged with a medium time constant $\tau_M$.

As soon as the deviation voltage $U_D$ is less in amount than threshold voltage $U_{SCH}$, the level at output 19 of comparator 15 changes, thus influencing discharging circuit 9 via AND-gate 17 whose input is connected with output 19 so that integrator 8 is discharged with a short time constant $\tau_K$. However, this time behavior is maintained only until the delta voltage $U_{DS}$ has reached a value which corresponds to the limit voltage $U_G$ set at voltage divider 20. Output 10 of integrator 8 is additionally connected with one input of comparator 16, with the negative limit voltage $U_G$ appearing at its second input. As soon as delta voltage $U_{DS}$ has reached limit voltage $U_G$, output 21 of comparator 16 switches over. This output 21 is connected with the second input of AND-gate 17. In this state, the output of AND-gate 17 connected with discharging circuit 9 controls discharging circuit 9 in such a manner that integrator 8 is discharged with a long time constant $\tau_L$. As will be described in greater detail with reference to FIGS. 3 and 4, this variation of delta voltage $U_{DS}$ in the descending edge region via comparator 11 serves to change the position of the phase angle of triac S essentially as a function of the deviation voltage $U_D$ causing additional heating energy to be fed into the heating cabinet.

Figure 2:
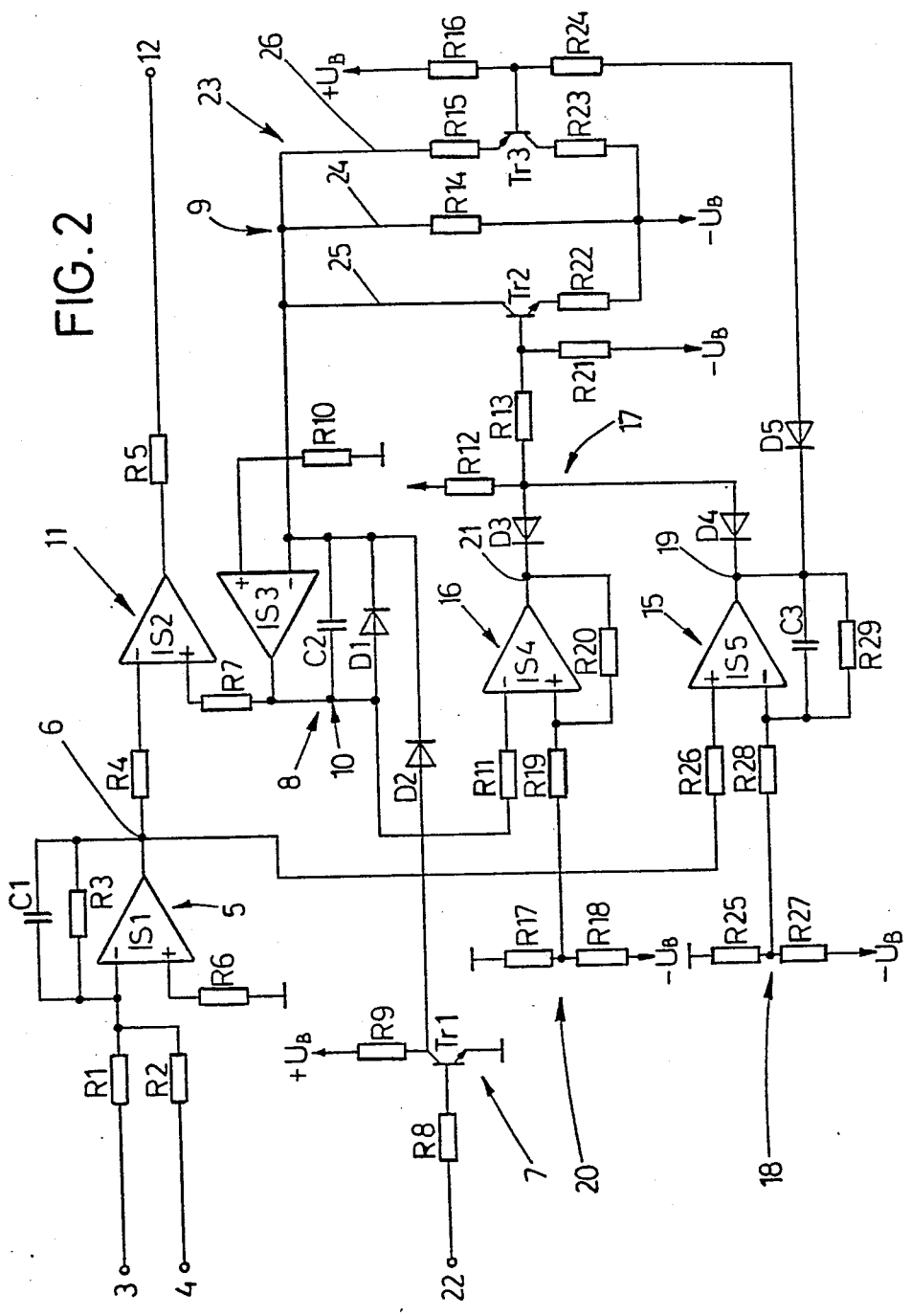
FIG. 2, a circuit diagram for the regulating component of the temperature control circuit.

The precise circuit structure will be described below with reference to FIG. 2. Inverse adder 5 is essentially realized by an operational amplifier IS1 which is feedback connected between its output and its inverting input by means of a capacitor C1 and a resistor R3. Its non-inverting input is connected to ground potential via a series resistor R6. Via inputs 3 and 4, respectively, and series resistors R1, R2, the measuring voltage $U_{TH}$ and the desired voltage $U_S$ are applied to the inverting input of operational amplifier IS1. Thus a difference voltage between the measuring voltage $U_{TH}$ and the desired voltage $U_S$ is present at operational amplifier IS1. The output level of this amplifier represents the deviation voltage $U_D$ which, starting at branch point 6, is applied via a series resistor R4 to the inverting input of operational amplifier IS2. Operational amplifier IS2 takes over the function of comparator 11 of FIG. 1.

Starting at branch point 6, deviation voltage $U_D$ is applied, via a series resistor R26, to the non-inverting input of operational amplifier IS5 which performs the function of comparator 15 of FIG. 1. Operational amplifier IS5 is feedback connected between its output and the non-inverting input by means of a capacitor C3 and a resistor R29 connected in parallel thereto. By way of a series resistor R28, the threshold voltage $U_{SCH}$ obtained at voltage divider 18 between the two resistors R25 and R27, which are connected in series between ground potential and the negative operating voltage $-U_B$, is applied to the inverting input of resistor R29.

Line voltage synchronizing member 7 is composed of a transistor TR1 and its base resistor R8 as well as a collector resistor R9. Rectified, positive line half-waves 27 (see FIGS. 3a and 4a) are fed in at base terminal 22. Transistor TR1 operates as a electronic switch which opens during the zero passages of the line half-waves. If transistor TR1 is in the open state, capacitor C2 is charged by the positive supply voltage $U_B$ via a resistor R9 and a diode D2 with a charging time constant $\tau_{LD}=R9 \times C2$. Capacitor C2 and a Zener diode D1 and an operational amplifier IS3 connected in parallel therewith essentially form the integrator 8 of FIG. 1. Via series resistor R10, the non-inverting input of operational amplifier IS3 lies at ground potential. Zener diode D1 takes care that the voltage level at capacitor C2 is limited.

The node between the output of operational amplifier IS3, the negatively charged capacitor plate of C2 and the anode of Zener diode D1 essentially constitutes the output 10 of integrator 8.

The negative delta voltage $U_{DS}$ at the output 10 of integrator 8 is applied via resistor R7 to the non-inverting input of operational amplifier IS2. The latter thus compares $U_{DS}$ with the control deviation voltage $U_D$.

Capacitor C2 can be discharged by way of the resistance network 23 which constitutes the discharging circuit 9 of FIG. 1. It comprises three parallel branches 24, 25 and 26 connected toward negative operating voltage $-U_B$, the branches including a resistor R14, a transistor TR2 which operates as an electronic switch in series with a resistor R22, and a transistor TR3 operating as an electronic switch in series with resistors R15 and R23, respectively. If the two transistors TR2 and TR3 are not conductive, i.e. are open as switches, capacitor C2 is discharged with a long time constant $\tau_L=C2 \times R14$. If the parallel branch 25 including transistor TR2 and resistor R22 is connected in parallel with parallel branch 24, capacitor C2 is discharged with a short time constant $\tau_K=C2 \times R22 \times R14/(R22+R14)$. If instead parallel branch 26 is connected to branch 24 instead of parallel branch 25, capacitor C2 is discharged with a medium time constant $\tau_M=C2 \times (R15+R23) \times R14/(R15+R23+R14)$.

The connections of transistors TR2 and TR3 are made by way of a logic circuit composed essentially of operational amplifiers IS4 and IS5. The inverting input of operational amplifier IS4 is connected via resistor R11 with the output 10 of integrator 8—i.e. with the negative potential side of capacitor C2. At its non-inverting input, which is coupled with resistor R20, there lies, via resistor R19, the limit voltage $U_G$ obtained between the two resistors R17 and R18 of voltage divider 20, with these resistors being connected in series opposition to the negative operating voltage $-U_B$. Diodes D3 and D4 which, in their blocking direction, are connected with the two outputs of operational amplifiers IS4 and IS5 and together via resistor R13 with the base of transistor TR2, form an AND-gate 17 with resistor R12 in known diode transistor logic.

Figure 3:
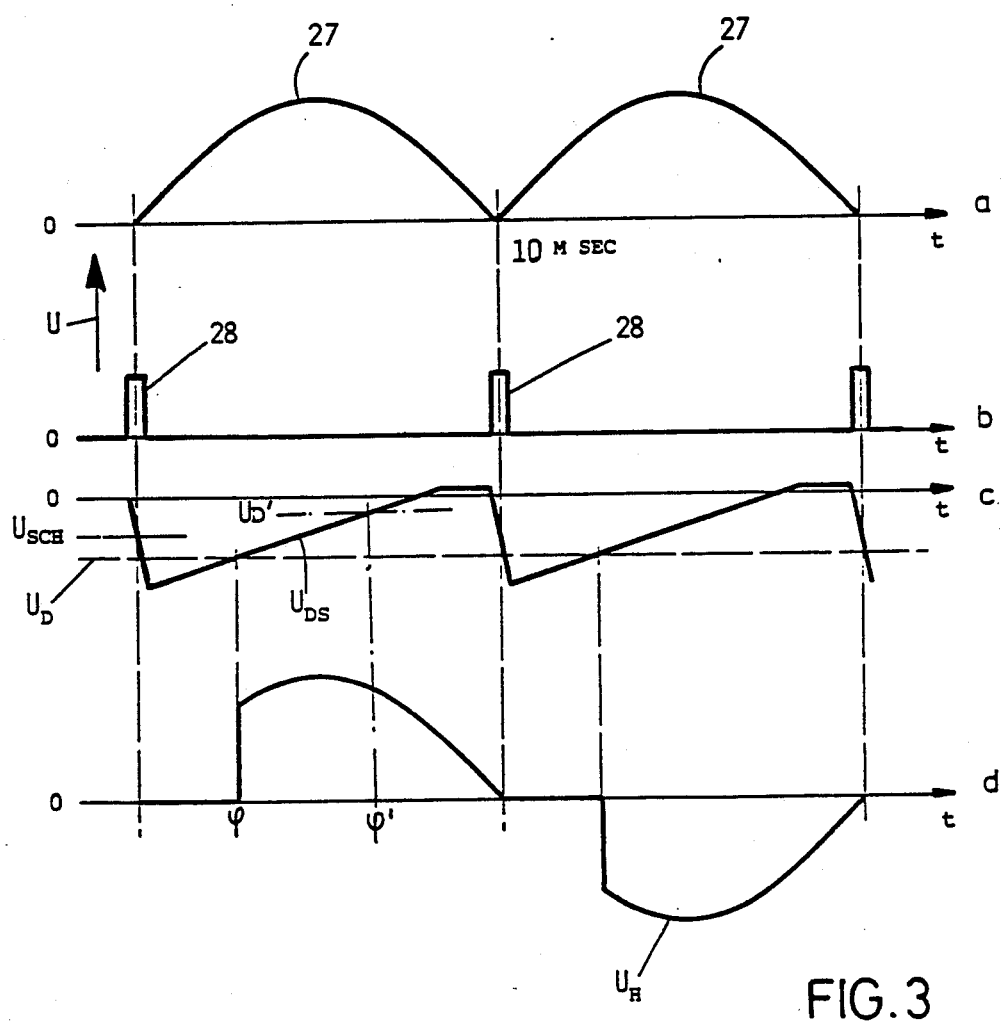
FIGS. 3 and 4, various time-voltage diagrams to explain the control method according to the invention.
Figure 4:
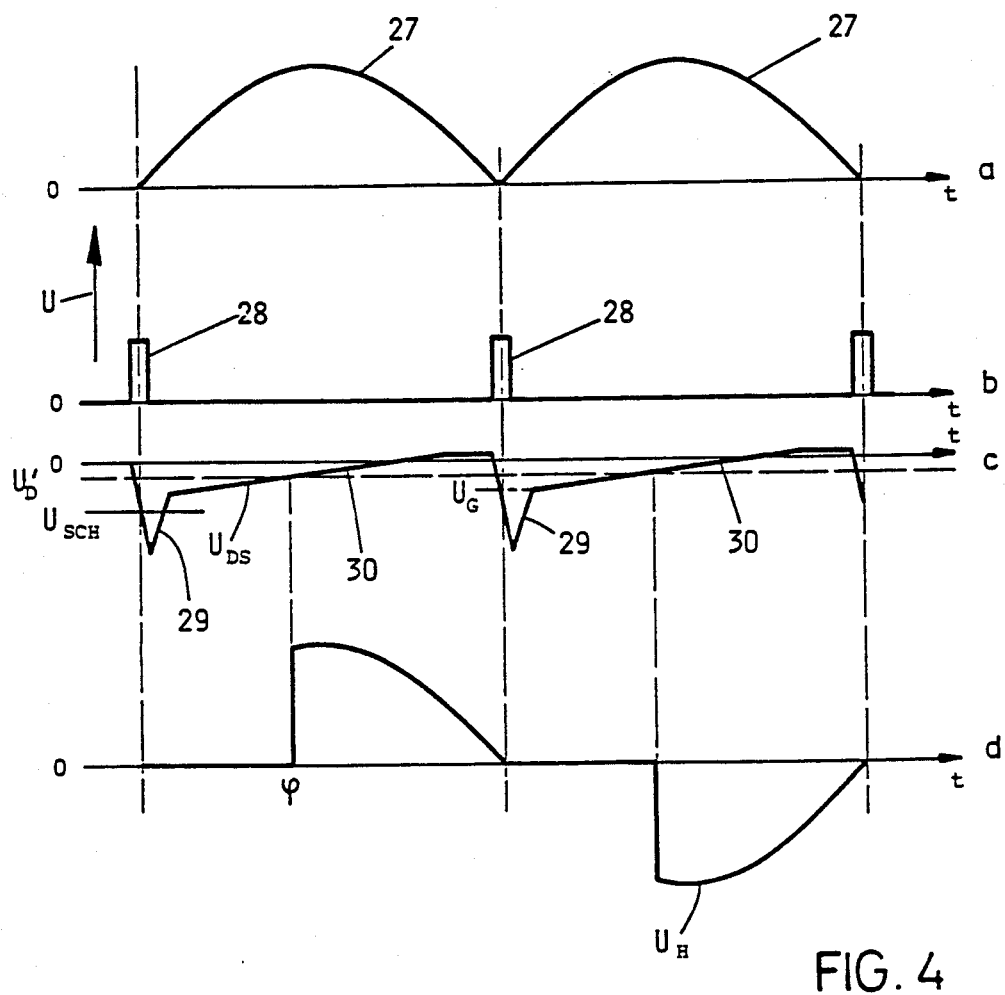

The regulating behavior of the circuit will be described with reference to FIGS. 3 and 4. These figures show time-voltage voltage diagrams; i.e. in FIGS. 3a and 4a, respectively, the positive line half-waves 27 being fed in at the input (base terminal 22 of transistor TR1) of line voltage synchronization member 7. FIGS. 3b and 4b, respectively, show the charging voltage for capacitor C2 present at capacitor C2 when transistor TR1 is opened. The short voltage pulses 28 fed-in with double the line frequency can be seen.

FIGS. 3c and 4c, respectively, show, by a solid line, the voltage curve at output 10 of integrator 8 and thus the line synchronous delta voltage $U_{DS}$ fed in at the non-inverting input of operational amplifier IS2. The horizontal dashed line represents the momentary deviation voltage $U_D$ which is essentially constant over a half-wave period.

FIGS. 3d and 4d, respectively, show the heating voltage $U_H$ present at heating element 14 and regulated by the phase angle control.

If deviation voltage $U_D$ is more negative than threshold voltage $U_{SCH}$, capacitor C2 is discharged according to FIG. 3c with the medium time constant $\tau_M$ in the region of its descending edge. In this state, transistor TR3 is closed by the output of comparator 15 (operational amplifier IS5) while TR2 is opened by AND-gate 17.

As long as the actual temperature still lies far below the desired temperature, i.e. deviation voltage $U_D$ is more negative than the negative maximum value of delta voltage $U_{DS}$ (this state is not shown in FIG. 3), the output of comparator 11 (operational amplifier IS2) remains positive during the entire half-wave. The line voltage is transmitted to heating element 14 with full power and without a shift in phase angle via the known actuating circuit 13 and triac S.

With increasing approach of the actual temperature to the desired temperature, a state is attained at which deviation voltage $U_D$ becomes more positive during part of delta voltage $U_{DS}$ than the latter (FIG. 3c). In that state, the output of comparator 11 (operational amplifier IS2) remains in the negative state, thus blocking triac S and during this part of the line half-wave, no energy is fed to heating element 14. As soon as delta voltage $U_{DS}$ becomes more positive than deviation voltage $U_D$, comparator 11 switches over to the positive direction, triac S is closed by actuating circuit 13, thus feeding energy to heating element 14 during the remaining half-wave period (FIGS. 3c, 3d). With increasing approach of the actual temperature to the desired temperature, deviation voltage $U_D$ approaches the zero line of FIG. 3c (see $U_{D'}$). The phase angle $\phi$ (FIG. 3d) is thus displaced to the right ($\phi'$), i.e. the line half-wave to supply heating element 14 would be switched on later and later. Thus heating element 14 would no longer have sufficient energy available to ensure that the actual temperature can reach the desired temperature or to ensure, after an overshoot, that over the long-term behavior of the regulating process the desired temperature would be maintained.

Therefore, the delta voltage $U_{DS}$ is varied as shown in FIG. 4c. As soon as deviation voltage $U_D$ exceeds threshold voltage $U_{SCH}$, the output of comparator 15 (operational amplifier IS5) becomes positive and thus transistor TR3 is opened. Comparator 16 (operational amplifier IS4) compares the limit voltage $U_G$ set at voltage divider 20 with the delta voltage $U_{DS}$. Its output signal and that of comparator 15 are fed to the inputs of AND-gate 17 (diodes D3 and D4, resistor R12). If deviation voltage $U_D$ is more positive than threshold voltage $U_{SCH}$ and delta voltage $UD_S$ is more negative than limit voltage $U_G$, transistor TR2 is closed, thus discharging capacitor C2 quickly via R14 and R22 with a short time constant $\tau_K$ (steep descending edge 29 in FIG. 4c). As soon as delta voltage $U_{DS}$ exceeds the value of limit voltage $U_G$, the output signal of comparator 16 (operational amplifier IS4) switches over and transistor TR2 is opened via AND-gate 17. Capacitor C2 is now discharged with the long time constant $\tau_L$, only via the center parallel branch 24 including resistor R14. Thus delta voltage $U_{DS}$ has the flat descending edge 30 shown in FIG. 4c.

Compared to the curve of delta voltage $U_{DS}$ shown in FIG. 3c, the latter now becomes more positive than the deviation voltage at an earlier time during each line half-wave, thus causing the switching signal to appear earlier at output 12 of comparator 11 (operational amplifier IS2). Triac S is switched on at an earlier point in time with respect to the half-wave duration. With respect to the deviation, heating element 14 thus receives more energy. This excess can be set by varying the limit voltage as a function of the desired control parameters. In the curve of delta voltage $U_{DS}$ shown in FIG. 3c, phase angle $\phi$ is significantly smaller than phase angle $\phi'$ with the same deviation voltage $U_{D'}$.

It must be pointed out that the essential components of the described circuit can also be realized on a digital basis or by means of a microprocessor.

What is claimed:

1. In a method for controlling temperature in a compartment of an appliance, the compartment being heated by a heating element supplied with heating power by line voltage regulated by a controllable switch which can be turned on at a controllable phase angle of the line voltage, comprising:
   generating a measuring voltage representing an actual temperature in the compartment;
   generating a desired voltage representing a desired temperature in the compartment;
   forming a difference between the desired voltage and the actual voltage to obtain a deviation voltage representing a deviation between the desired temperature and the actual temperature;
   shifting the phase angle of the controllable switch in proportion to the deviation voltage;
   generating from the line voltage a line-synchronous delta voltage having a waveform presenting descending edge region;
   comparing the deviation voltage with the descending edge region of the line-synchronous delta voltage during each half wave of the line voltage; and
   generating an output signal which controls the position of the phase angle for turning on the controllable switch from the time when the amplitudes of the desired voltage and the actual voltage have the same amplitude, the improvement wherein:
   said step of generating a line-synchronous delta voltage includes generating a line-synchronous delta voltage having a waveform presenting: (1) a first descending edge region which has a relatively large voltage drop per unit of time down to a limit voltage when the deviation voltage is below a settable voltage threshold; and (2) a second descending edge region following in time the first descending edge region which has a relatively small voltage drop per unit of time.

2. The method of claim 1 including providing that the limit voltage is adjustable.

3. In a temperature control circuit for controlling temperature in a compartment of an appliance, comprising:
   a temperature-to-voltage converter means for generating a measuring voltage representing an actual temperature in the compartment;
   an adjustable voltage source for generating a desired voltage representing a desired temperature in the compartment;
   a difference former means connected to said temperature-to-voltage converter means and said voltage source for forming a difference between the desired voltage and the actual voltage to obtain a deviation voltage representing a deviation between the desired temperature and the actual temperature;
   heating element means for heating the compartment;
   controllable switch means connected to said heating element means and like voltage for proportionally regulating power to said heating element means by switching on the line voltage at a controlled phase angle of the line voltage;

delta voltage means for generating from line voltage a line-synchronous delta voltage having a waveform presenting a descending edge region;

comparator means connected to said difference former means and said delta voltage means for comparing the deviation voltage with the descending edge region of the line-synchronous delta voltage during each half wave of the line voltage and generating an output signal which controls the position of the phase angle for turning on the controllable switch from the time when the amplitudes of the desired voltage and the actual voltage have the same amplitude;

the improvement wherein:

said delta voltage means comprises means for generating a line-synchronous delta voltage having a waveform presenting: (1) a first descending edge region which has a relatively large voltage drop per unit of time down to a limit voltage when the deviation voltage is below a settable voltage threshold; and (2) a second descending edge region following in time the first descending edge region which has a relatively small voltage drop per unit of time.

4. The circuit of claim 3, wherein said delta voltage means includes: a capacitor which is connected for charging with a short time constant when a half wave of the line voltage passes through zero; and discharge circuit means connected to said capacitor for discharging said capacitor with a medium length time constant during the remainder of the half wave of the line voltage and for discharging said capacitor with a relatively short time constant after the deviation voltage reaches the threshold voltage and until the limit voltage is reached and thereafter for discharging said capacitor with a relatively long time constant.

5. The circuit of claim 4, wherein said dsscharge circuit means comprises:

a resistance network including parallel branches each having different resistances which determine the various discharging time constants; and logic circuit means connected to said resistance network and including: a first comparator connected to said difference former means and coupled to the threshold voltage for comparing the threshold voltage with the deviation voltage; and a second comparator connected to said delta voltage means and coupled to the limit voltage for comparing the limit voltage with the line-synchronous delta voltage; and an AND-gate having inputs connected to the outputs of said first and second comparators and an output connected to said resistance network.

6. The circuit of claim 5, wherein said parallel branches include electronic switches coupled to the outputs of said AND-gate and said first comparator for selectively switching said parallel branches in and out for determining the discharging time constant of said capacitor.

7. The circuit of claim 6, wherein said resistance network comprises: a source of negative potential; a first branch including a resistor continuously connected between said source of negative potential and said capacitor for defining the long discharging time constant; a second branch including a first series circuit having a resistor and a first electronic switch, said first series circuit being connected between said source of negative potential and said capacitor, and said first electronic switch having a control input connected to the output of said first comparator for selectively switching said second branch in parallel with said first branch to define the medium length discharging time constant; and a third branch including a second series circuit having a resistor and a second electronic switch, said third series circuit being connected between said source of negative potential and said capacitor, and said second electronic switch having a control input connected to the output of said AND-gate for selectively switching said third branch in parallel with said second branch to define the short discharging time constant.

* * * * *